May 5, 1964   I. A. OVERMYER   3,132,082
CATHODIC PROTECTION FOR WATER STORAGE TANKS
Filed May 29, 1961

INVENTOR.
IRVIN A. OVERMYER
BY
Marvin M. Chaban
ATTORNEY

3,132,082
CATHODIC PROTECTION FOR WATER STORAGE TANKS

Irvin A. Overmyer, Hales Corners, Wis., assignor to General Electric Company, a corporation of New York
Filed May 29, 1961, Ser. No. 113,273
3 Claims. (Cl. 204—196)

The present invention relates to water storage tanks and more particularly to cathodic protection for such tanks.

It is an object of the invention to provide a powered anode for use in a water storage tank which has improved means associated with the anode for deenergizing the anode on the accumulation of an excessive amount of gas in the tank.

It is a further object of the invention to provide a plurality of electrodes depending into a water storage tank, and to utilize one pair of said plurality of electrodes to complete a series alternating current circuit through the water content of the tank for the direct current energization of a third electrode, whereupon if for any reason the paired electrodes become dry, the energization of said third electrode is interrupted.

It is a further object to provide a unidirectionally powered anode extending axially into a water storage tank for corrosion protection, the energizing circuit of which includes a pair of liquid sensing electrodes connected in an alternating current circuit and depending into said tank to open the unidirectional circuit to the powered anode on formation of a pocket of gas in the tank.

Apparatus illustrative of an application of this invention includes a storage tank, such as a water heater tank, of the type in which steel plate is formed into the shape of an upright cylinder. The interior of the tank is protectively coated with suitable lining material such as glass or porcelain. It is generally known and conceded that even the best commercially producible linings are imperfect and contain many small holes or holidays. To protect the tank from corrosion or pitting at these holes, there may be used an anode extending into the tank interior. These anodes generally fall into one of two categories which may in general terms be called sacrificial and non-sacrificial. Sacrificial anodes are those fabricated of magnesium or similar metals having a suitable electro-chemical relationship with the steel of the tank, whereby the resultant battery generates current causing the metal of the anode to plate out as a protective film on exposed portions of the tank lining. Non-sacrificial or powered anodes are generally those which employ a noble metal such as platinum, titanium, tantalum or columbium. In such arrangements, there is no adequate electro-mechanical battery established, and the anode is made electrically positive by impressing thereon a small direct-current voltage of positive polarity. The amount of the impressed voltage is dependent, among other things, on the quality and material in the tank lining, and the electrical conductivity of the water within the tank.

It is well known that in both types of anodes, the electrolysis of the water produces quite substantial amounts of combustible gas such as hydrogen and oxygen. Under conditions of normal draw-off of water, the gas is continuously dissipated, but in the circumstance of prolonged stand-by conditions with little or no draw-off, the gases can accumulate in a substantial pocket at the top of the tank. These pockets have been known to cause explosions and the like, a fact which various safety codes have recognized and attempted to regulate.

One method of dissipating the gas is to prevent the further generation of gas while allowing a longer period for the gas already formed to be absorbed or dissolved in the water in the tank. It is to this method that the present invention applies.

Specifically, the present invention employs a non-sacrificial or powered anode which preferably may be platinum, titanium, or platinum-clad titanium and extends a considerable distance into the water of the tank to provide cathodic protection against corrosion of the interior tank walls. Further the energizing circuit to the anode includes a serial path through a pair of electrodes extending a short distance into a portion of the tank within which the gas will accumulate. The circuit to the anode is normally completed across the water in which the pair of electrodes is immersed; and as this water becomes displaced by the accumulating gas, the circuit to the anode is interrupted so that no additional gas is formed and that the gas already formed may be dissipated.

In one form of my invention, I utilize a transformer with the liquid sensing electrodes in the transformer primary circuit, and the powered anode in the secondary circuit. The primary circuit receives the alternating current input while the current in the secondary circuit is rectified to provide a direct current output. In this way, the current direction through the sensing electrodes is reversed cyclically by the alternations from the source to neutralize the otherwise adverse effects of direct current across the electrodes while still maintaining the necessary direct current output to the anode.

In the second form of my invention there is provided a transformer with the oeprative circuit components in the transformer secondary circuit. A bridge rectifier is utilized in the secondary circuit to rectify the received alternating current for transmission to the powered anode. The electrodes are placed in the input circuit to the bridge rectifier to retain the beneficial neutralizing effects of the alternating current across the electrodes.

Naturally, in both forms of my invention, voltage and current to the electrodes are maintained at a very low level to prevent possible troublesome effects such as arcing.

The invention both as to its organization and principle of operation together with further objects and advantages thereof, will best be understood by reference to the following specification taken in conjunction with the drawings in which.

Figure 1:
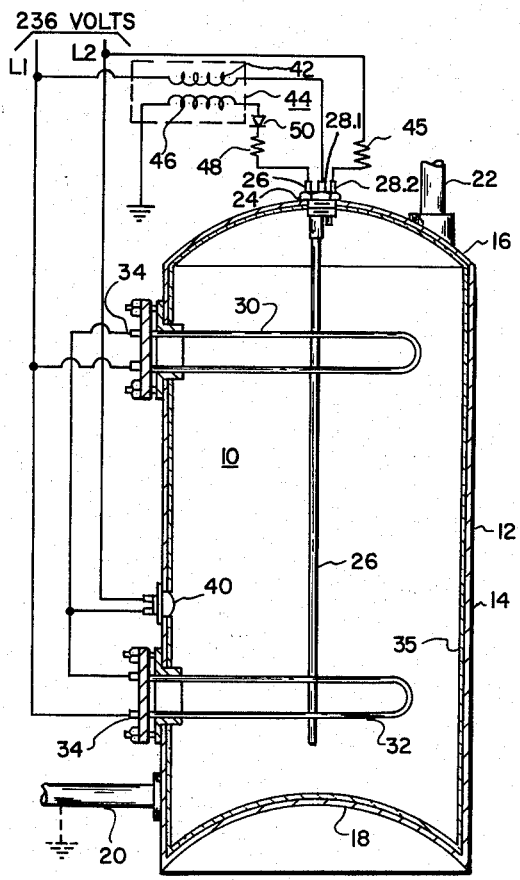
FIG. 1 is a side sectional elevation of a water heater tank employing my invention.
Figure 2:
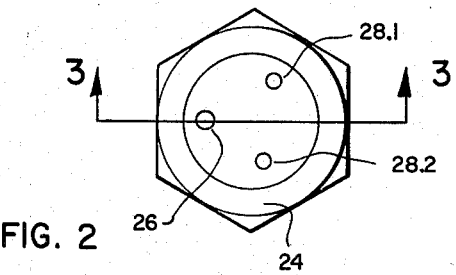
FIG. 2 is a top plan view of the electrode mounting structure.

Referring to the drawings, especially FIG. 1, there is shown a water heater designated 10 including a steel tank 12 comprising a cylindrical, vertical sidewall 14 and upper and lower heads 16 and 18 respectively. The tank 12 is provided with an inlet water pipe 20 which may be secured in threaded or other suitable engagement with an opening in the lower portion of sidewall 14. The upper end head 16 is provided with an outlet water pipe 22 which is used to draw off the heated water in a generally known manner. In the usual installation, the tank itself will be electrically connected to ground by way of the metal inlet and outlet pipes. In any other situation, the tank should be electrically grounded by a conventional grounding rod or equivalent circuit means (not shown). The upper head 16 may be domed in shape, the apex of the dome being provided with a centrally disposed threaded opening into which is inserted an anode bearing structure 24. This anode structure which may be threaded into the opening includes an anode 26, the powered anode previously referred to, which extends downwardly into the tank along the axis thereof, to within a short distance of the lower head 18. A pair of electrodes, 28.1 and 28.2, are also borne by structure 24 to extend downwardly into the tank for a short distance. Certain exemplary dimensions have been provided as follows: the electrodes may be immersed to a depth of ¼″ in the water under normal conditions. These electrodes may be spaced apart by about ⅜ of an inch center to center distance and each may be of about ⅛ of an inch in diameter in the present usage. The electrodes and the anode are mutually insulated within the structure 24 in any suitable manner. The anode 26 is of the non-sacrificial type which optionally may be fabricated from titanium, platinum-clad titanium or other suitable metals which are considered to be insoluble in water. It will be understood that the invention is applicable to the protection of water storage tanks as such, and not specifically to those comprising an element of a storage type water heater. Also, it is not related to any specific method of heating water although the power circuit for the heating units of an electric water heater makes power easily available for the powered anode 26.

The tank sidewall 14 is illustrated as having openings through which horizontally disposed heating units such as 30 and 32 are inserted. As can be seen in FIG. 1, the two heating units 30 and 32 are spaced from one another in the vertical sense and each extends substantially across the tank for efficient heat transfer to the water within the tank.

Each of the heating units comprises a helical resistance conductor housed in a rigid metallic sheath and insulated from the sheath by a highly compacted mass of suitable heat conducting and electrically insulating material such as powdered magnesium oxide. Each heating unit is configured ito a U shape for immersion within the tank, the free ends 34 of the U extending from the tank sidewall 14 for connection to a suitable power source. The sidewall of the tank is suitably sealed about the juncture of the heating units and the adjacent wall so that the tank is retentive of the water container therein even at substantially elevated water temperatures and pressures.

To minimize corrosion of the tank, a coating 35 of glass, porcelain, or other suitable non-corrosive material is bonded to the inner walls of the tank in any generally known manner. Further, the seals about the heating units should electrically insulate the units and the junction area from the tank to minimize the galvanic effects at the line of joinder of the ferrous metal tank and the brass or similar metal of the heating unit sheath and mounting. This insulation also serves to prevent the excess flow of cathodic current to the grounded sheath of the unit. These linings and insulation at best are somewhat less than perfect, and cathodic protection in the form of the anode 26 is used to prevent the electro-galvanic deterioration of any tank wall portion which may be exposed to the water because of holidays or imperfections in the tank lining.

The use of and application of a powered anode is well known in the art. In a tank of the illustrated type a typical powered anode utilizes approximately 10 milliamperes of current, at about 5 volts. The power so supplied has been found sufficient to maintain exposed tank wall areas electrically negative, and thus prevent corrosion in a porcelain-lined steel tank where the exposed or unlined area is as much as 2 square inches. The usual good commercial quality porcelain-lined tank has much less exposed area. It is also well known that a powered anode generates oxygen gas at the anode and hydrogen gas at the exposed tank wall, which comprises the cathode in the electrical circuit.

By test it has been found that in a conventional glass-lined water heater tank containing Chicago (Ill.) tap water, a powered anode using the above listed circuit parameters will generate 25 cubic centimeters of gas during a 24-hour period. The gas composition comprises, in a typical analysis, 41.5% hydrogen, 17.8% oxygen, 0.4% carbon dioxide, with the remainder substantially nitrogen.

During normal usage of the water tank with water being drawn off several times per day, the gases ($H_2$), ($H^+$) and $O_2$ are absorbed and removed by the water. When the tank is maintained in a standby condition, i.e., operating but no liquid being drawn off, the generated gases first saturate the static liquid stored within the tank. If no water is drawn off at this stage, an excess of gas accumulates and will rise to the highest point within the tank. In the illustrated apparatus this will be in the area occupied by the electrodes adjacent curved top wall 16. If gas continues to accumulate, as may happen when the owners of the home containing the water heater are on a vacation of protracted duration, a considerable possibility of explosion would exist. It is to alleviate this possibility that the present construction comes into play.

In FIG. 1, there is shown one form of the energizing circuit for the water heater which is connected to a 236 volt alternating current source with its leads labeled L1 and L2 in the conventional manner. Across leads L1 and L2 there is developed the 236 volts which is connected to the heating units 30 and 32 through the normally closed thermostat 40. Naturally, the heating units, both upper and lower, are connected in parallel to share the full 236 volt input; and if desired, individual thermostats could be provided for each heater.

To the conductor L1 there is connected the primary 42 of a transformer 44. The transformer is used to reduce the applied voltage to a value within the range necessary for use in energizing the powered anode.

The other leg of transformer primary 42 is connected to one electrode 28.1 of the pair. The other electrode 28.2 is connected to complete a circuit through current limiting resistor 45 to lead L2 and the source. One leg of the secondary 46 of transformer 44 is connected to ground through any suitable grounding media. The other side of the secondary 46 is connected through current limiting resistor 48 and diode rectifier 50 to anode 26. The circuit from the anode will be completed to ground through the liquid in the tank and the holes in the tank lining to the grounded inlet pipes or the like.

With this circuit as set out, the current across the electrodes is alternating current reduced to the necessary low voltage and current by resistor 45 which should have a resistance high enough to limit current to a safe level in event of malfunction. Suitable arc suppression means may be used to minimize or balance the inductive reactance of transformer primary 42 and further reduce the possibility of a spark across electrodes 28.1 and 28.2.

As mentioned previously quite briefly, where a direct current is impressed on the gas sensing electrodes, one permanently becomes the anode and the other the cathode. The anode would tend to enter solution and there would be deposition of calcium carbonate on the cathode. The reactions would tend over a period of time to radically change the resistive relationship between the electrodes and the current passed by the transformer primary circuit. This change in the transformer primary would tend to induce an undesirable change in the transformer secondary to the powered anode. Therefore, by applying an alternating current across the electrodes, the anode and cathode are reversed each half cycle. This reversal will inhibit the build-up of calcareous deposits on the cathodic electrode and prolong the electrode life considerably.

In the circuit embodiment shown in FIG. 1, a circuit is completed from lead L1, through transformer primary 42, electrode 28.1, the liquid contents of tank 10, electrode 28.2, and resistors 45 to lead L2. This circuit is constantly changing in current direction and intensity so that neither of the electrodes can permanently become a cathode or anode. Alternating current is induced in the transformer secondary and rectified there by the use of diode 50. Thus, as long as there is a complete circuit in the transformer primary, a direct current is impressed on powered anode 26. When a gas accumulation occurs in the tank, the resistance of the gap across the electrodes tends toward infinity, thereby opening the circuit to the transformer primary. As a result, little or no current can flow in the transformer secondary and the powered anode is deenergized.

Figure 4:
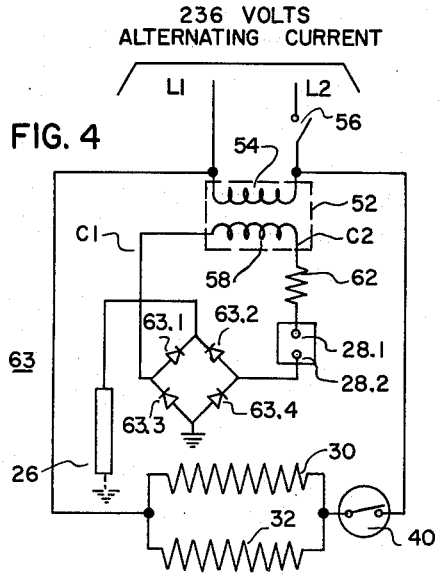
FIG. 4 is a diagrammatic representation of a control circuit for my invention.

In the circuit embodiment of FIG. 4, there is shown a transformer 52 with its primary winding 54 connected across the source conductors L1 and L2 through a suitable On-Off switch 56. The transformer secondary 58 is included in a circuit which may be traced from one leg C2 of the transformer secondary through resistor 62, electrode 28.1, contents of tank 10, electrode 28.2 to bridge rectifier 63. This rectifier of generally known circuit configuration includes four diodes 63.1, 63.2, 63.3 and 63.4 connected as shown. As can be seen, the other conductor C1 from the transformer secondary is connected to one input side of the bridge rectifier 63. Anode 26 is connected at one output corner of the bridge and at its free end anode 26 will complete a circuit to ground through the tank contents. The other output end of the bridge is also suitably grounded. With this circuit configuration, when the voltage on conductor C1 is positive due to the alternating current input, a circuit may be traced from C1 through diode 63.1, anode 26 to ground through the tank wall at the holes in the lining. To complete this circuit, the remainder of the current path may be traced from ground through diode 63.4 to electrode 28.2, electrode 28.1, resistor 62 to conductor C2 and the transformer secondary 54.

During the next alternation when conductor C2 may be considered as the positive side of the transformer, the circuit may be traced through resistor 62, electrodes 28.1 and 28.2, diode 63.2, and anode 26 to ground. From ground the remaining circuit includes diode 63.3 to lead C1 and the negative side of the transformer secondary. From this brief explanation it can be realized that although the current flow through anode 26 is unidirectional, the direction of current flow across electrodes 28.1 and 28.2 alternates with the change in the alternating current input. In this way, the corrosive effects of current across the electrodes can be balanced to even the wear across the electrodes. This balance of wear has been found to prolong the life of the electrodes in use considerably even with the small power transmitted between electrodes.

Figure 3:
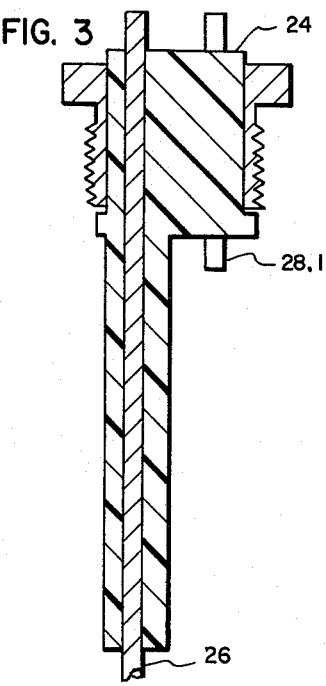
FIG. 3 is a sectional view taken along lines 3—3 of FIG. 2.

In viewing FIG. 3, it can be seen that anode 26 is insulatedly covered by depending insulating tube 54 to a termination of the insulation at a position remote from the electrode pair. Thus the input voltage could not readily short across from either electrode 28.1 or 28.2 to the anode 26. The electrodes themselves are physically positioned quite close together so that there cannot be an appreciable voltage drop across the water between the electrodes. However, when the water is displaced by electrolyzed gas, the resistance between electrodes tends toward the infinite and little to no power is transmitted to power anode 26.

Repeating, the energizing circuit to powered anode 26 includes a conductive path through the water in the tank. Gas is continually generated by the anode between immersed electrodes. With continual drain-off of water, this gas is absorbed into the water. When water has not been drawn off for a protracted period, which may be upwards of two to three weeks, the water becomes saturated with generated gas and a gas pocket begins to form. Electrodes 28.1 and 28.2 are physically positioned at the uppermost extent of the tank interior so that they will be within the area encompassed by the initial gas formation with such gas formation; following which the resistance between electrodes 28.1 and 28.2 will become almost infinite and flow of current to anode 26 will be cut off. Thus, no additional gas is formed and the gas which has been already formed slowly dissipates. The status quo, little or no gas being formed and retained in the tank, is thereby maintained. When finally, the gas-saturated water is drawn off and fresh water enters the tank, the anode may be operated for a considerable period with no added gas generation.

Within this framework there has been provided means for supplying alternating current across the liquid or gas sensing electrodes while supplying unidirectional current to the anode. Thus, each half cycle, the current direction through the sensing electrodes is reversed to balance the effects on the electrodes induced by the current and maintain the current parameters relatively constant.

While there has been described what is at present thought to be the preferred embodiments of the invention, it will be appreciated that it is intended to cover in the appended claims all modifications which fall within the true spirit and scope of the invention.

What is claimed is:

1. In a water storage tank having a protective lining exposed to the water in said tank, means for cathodically protecting the tank from corrosive effects of said water comprising: means for electrically connecting said tank to ground, an anode extending into said tank for substantially the full length of said tank and arranged to intimately contact the water in said tank, an energizing circuit connected between said anode and said tank comprising a pair of spaced electrodes extending into said tank for a short distance at a high point of said tank, said electrodes being serially arranged in said energizing circuit to complete the energizing circuit to said anode through the space between said electrodes, means for connecting said electrodes to an alternating current source to cyclically alternate the current direction in the serial circuit through said electrodes, means for converting the current from said source to a unidirectional current flow proportional to the current flow through said electrodes to power said anode, whereby the resistance of said serial energizing circuit to said anode increases responsive to an accumulation of gas in said tank.

2. The combination recited in claim 1, wherein said converting means includes a full-wave rectifier to rectify the alternating current across said electrodes to supply direct current for transmission to said anode.

3. The combination recited in claim 1 wherein said means for connecting said electrodes to an alternating current includes the primary of a transformer, and wherein said converting means includes the secondary of said transformer and rectifying means.

References Cited in the file of this patent

UNITED STATES PATENTS

| | | |
|---|---|---|
| 2,752,308 | Andrus | June 26, 1956 |
| 2,898,282 | Flook et al. | Aug. 4, 1959 |
| 2,986,512 | Sabins | May 30, 1961 |
| 3,056,738 | Fischer | Oct. 2, 1962 |